Jan. 12, 1932.  C. CURTIS  1,840,935
PISTON RING AND EXPANDER THEREFOR
Filed Aug. 7, 1930
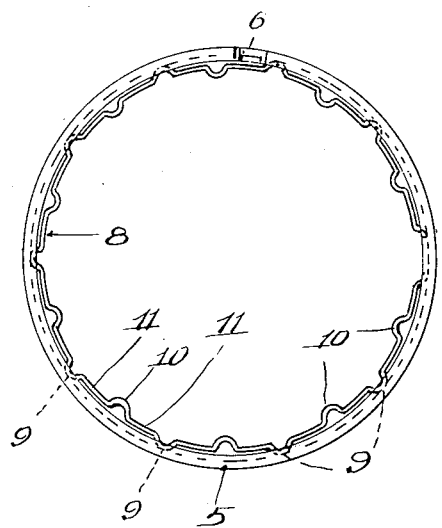
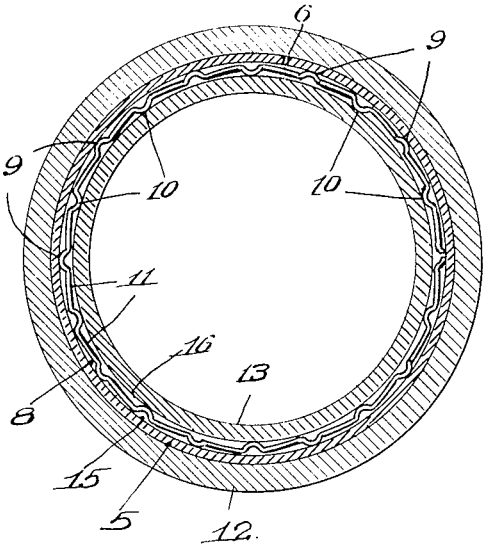
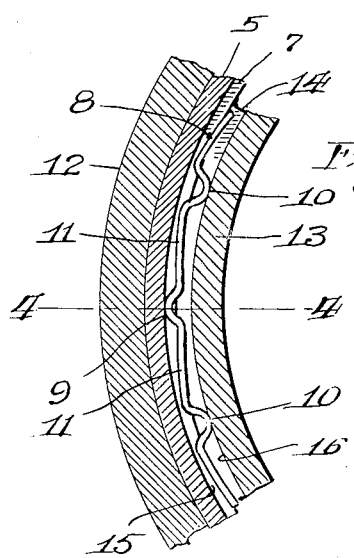
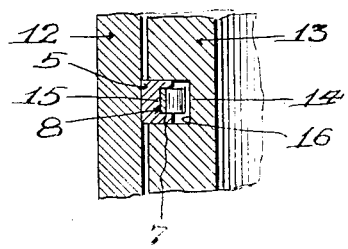
Inventor;
Charles Curtis,
by Charles O. Flurry
his Atty.

Patented Jan. 12, 1932

1,840,935

UNITED STATES PATENT OFFICE

CHARLES CURTIS, OF CHICAGO, ILLINOIS

PISTON RING AND EXPANDER THEREFOR

Application filed August 7, 1930. Serial No. 473,556.

This invention relates to piston rings and expanders therefor, and its principal object is to prevent the occurrence of "piston slap", as it is commonly known in the trade. As is well understood by those skilled in the art to which this invention pertains, clearance is left between the piston and cylinder wall of an internal combustion engine, and this clearance is likely to vary under different operating conditions and also from wear.

Piston slap results from the piston being thrown from side to side against the cylinder wall, and many efforts have been made heretofore to overcome this difficulty by providing piston rings and piston ring expanders with a view towards minimizing the disagreeable noise produced by the piston slap, but such efforts have not resulted in any great success, due, in many instances, to the fact that the ring or expander loses its resiliency and becomes more or less "set" and thus becomes inefficient for the purpose intended.

In accordance with the present invention, I provide a flexible or resilient piston ring in combination with a crimped strip of spring metal formed with crimps or kinks projecting laterally from both sides of the strip in alternate relation and suitably spaced apart and adapted respectively to continuously engage with the piston ring and piston, the portions of the strip between such crimps or kinks (when the device is in use) being deflected out of the normal curved line of the expander, whereby pressure is always applied against the opposing faces of the cylinder and piston, each such deflected portion of the expander acting, to all intents and purposes, as an arm capable of swinging or vibrating back and forth in the space between the piston and piston ring.

Another object of the present invention is to provide an expander adapted to exert lateral pressure against the piston ring at a multiplicity of places along its inner side, whereby the piston ring is held in continuous contact with the cylindrical wall of the cylinder, despite any malformation thereof due to expansion or wear. Another object is to provide an expander of novel form, whereby any tendency to lose its shape or become set is eliminated.

Other objects and advantages will occur in the course of the present specification, and with said objects and advantages in view, this invention consists in the several novel features hereinafter fully set forth and claimed.

The invention is clearly illustrated in the drawings accompanying this specification in which—

Figure 1 is a plan of the piston ring and an associated expander illustrating a simple form of the present invention, and showing the parts in their expanded condition before being put into service;

Fig. 2 is a horizontal transverse section through a cylinder and piston showing the piston ring and expander applied to the piston, the piston ring also being shown in section;

Fig. 3 is a detail enlarged fragmental horizontal section taken through the cylinder, the piston and piston ring, and showing the expander in plan; and Fig. 4 is a detail horizontal fragmental section taken on the line 4—4 of Fig. 3.

Referring to said drawings, which illustrate one embodiment of the present invention, the reference character 5 designates a piston ring which is more or less resilient and may be formed from cast iron, as is customary, or from any other suitable material. The ring is open at 6 and is provided with a conventional lap joint at said place, as usual. If desired, the piston ring may be of the more or less flexible type, whereby it may be caused to conform evenly to any irregularities in the internal wall of the cylinder. The piston ring is formed with an internal annular groove 7 in which is contained the expander 8.

The expander is composed of a strip or ribbon of spring metal which is crimped at a multiplicity of places to form projections or protuberances 9 and 10, those indicated by the reference character 9 projecting from one side of the strip and those indicated by 10 projecting from the opposite side thereof and being disposed intermediate the projections 9. The crimps or kinks are formed in the strip by suitable dies or rolls. As a preference, the crimps are formed and the entire crimped strip bent into an annular or ring-link form, whereby the portions 11 of the strip which are located between and connect the crimps comprise the arcuate elements of the expander. The crimps are preferably formed and the strip bent into annular form before the expander is tempered, so that the finished product has an inherent tendency to retain its crimped annular form.

However, by using a strip or ribbon of certain kinds of metal of the proper gauge and capable of being properly tempered to obtain the final result, the crimps may be formed in a straight strip or ribbon, and the strip may be caused to assume a curved condition when inserted into the piston ring. In either case, the portions 11 of the expander assume an arcuate or circular form when inserted into the piston ring. The expander is made of sufficient length, so that when the piston ring is closed for insertion into a cylinder, the ends of the strip practically meet, as shown in Fig. 2.

The piston ring and expander are intended for use to make a tight joint between the piston and cylinder of an internal combustion engine and also to hold the piston in axial alignment with the cylinder and to prevent piston slap. A fragment of a cylinder is illustrated at 12 and a fragment of a piston is illustrated at 13. As is customary, the piston is provided with one or more annular grooves 14 in its outer cylindrical face to receive the piston ring and expander.

The piston ring, because of its inherent resiliency, acts to bear against the internal face of the cylinder, and the expander, because of its peculiar formation, acts to press the piston ring in radial directions at a multiplicity of points and also acts to press inwardly against the piston at a multiplicity of points intermediate the point of engagement with the piston ring. This position of the parts is best illustrated in Figs. 2 and 3, where it will be seen that the outer crimps or kinks 9 engage the inner face 15 of the piston ring and the inner crimps or kinks 10 engage the face 16 of the groove 14.

It will also be seen from an inspection of Figs. 2 and 3 that the arcuate portions 11 of the expander have been deflected out of their normal arcuate condition, the crimps 10 having been moved outward radially, thereby swinging the portions 11 in outward directions from their points of connection with the crimps 9, and thereby placing the portions 11 of the expander under tension which is exerted against the face 15 of the piston ring and the face 16 of the piston. Consequently, any tendency for the piston to move laterally in the cylinder is yieldingly resisted by the portions 11 of the expander and any such lateral movement of the piston, as may occur, is translated into swinging or oscillatory movements of the portions 11 of the expander. The points of connection between the portions 11 with the crimps 9 serve, to all intents and purposes, as fulcrums from which the swinging movements take place.

The portions 11 of the expander are relatively long as compared with the size of the crimps or kinks 9 and 10 and act in the nature of spring or resilient arms capable of oscillatory or vibratory movements when acted upon by the piston. Because of the fact that the expander is tempered after it has been formed, the kinks 9 and 10 and portions 11 therebetween tend to retain their normal condition and the tendency to resume an inert condition (which is inherent in most expanders) is practically eliminated.

I claim as new, and desire to secure by Letters Patent:

1. An expander for insertion in a piston ring groove behind a piston ring comprising a strip of resilient metal of uniform cross section throughout and having laterally disposed equi-distant projections on both sides of the strip, the projections on one side of the strip alternating with those on the other side thereof, and the portions of the strip between said projections being relatively long as compared with the projections, whereby under usage said portions function as resilient arms capable of swinging between the alternate projections when the intermediate projections are moved laterally of the strip.

2. An expander for insertion in a piston ring groove behind a piston ring comprising a single strip of resilient metal of uniform cross section throughout and curvilinear form having laterally disposed equi-distant crimped portions on both sides of the strip, the crimps on one side of the strip alternating with the crimps on the other side thereof.

3. A device for insertion in a piston ring groove behind a piston ring comprising a strip of resilient metal of uniform cross section throughout and having substantially the form of a circle and formed with spaced alternately arranged outwardly and inwardly projecting crimped portions connected by arcuate portions.

4. A device for insertion in a piston ring groove behind a piston ring comprising a single piece of crimped resilient metal of uniform cross section throughout, the alternate crimps projecting laterally from one side of the strip and the intermediate crimps projecting laterally from the other side thereof, the portions of the strip between the crimps being relatively long as compared with the size of the crimps.

5. A device for insertion in the piston ring groove behind a piston ring comprising a single piece of crimped spring metal of uniform cross section throughout and substantially circular in form, the alternate crimps projecting laterally from the external side of the strip and the intermediate ones projecting laterally from the internal side thereof and being adapted to be forced in an outward direction when applied to a piston, whereby the portions of the strip between the crimps are swung outward from their points of connection with the crimps on the external side of the strips.

6. A piston ring formed with an annular internal groove, in combination with a strip of spring metal of uniform cross section throughout and formed with alternately disposed outwardly projecting crimped portions entering said groove in the piston ring and also formed with inwardly projecting crimps disposed intermediate said outwardly projecting crimps and adapted when in engagement with the groove of a piston to place the arcuate portions of the strip, between the crimps, under tension.

7. A piston ring and expander comprising a resilient piston ring formed with an annular internal groove, in combination with a crimped strip of spring metal of uniform cross section throughout and of substantially circular form in which the alternate crimped portions project from one side of the strip and enter the groove of the piston ring and the intermediate crimped portion project from the other side of the strip and are adapted for pressing engagement against the bottom of a groove of a piston when applied thereto.

8. A piston ring and expander comprising a piston ring formed with an annular internal groove, in combination with a crimped strip of resilient metal of uniform cross section throughout and of which the alternate crimps project from one side and enter the groove of the piston ring and the intermediate crimps project from the other side of the strip and are adapted to bear against the bottom of the groove of a piston when the device is applied thereto, the portions of the strip between the crimps being capable of oscillatory movements between the crimps.

CHARLES CURTIS.